United States Patent
Valentine et al.

[11] 3,913,946
[45] Oct. 21, 1975

[54] REAR WHEEL DRIVE FOR A TRICYCLE

[76] Inventors: Henry L. Valentine, 1120 Toedtli Drive, Boulder, Colo. 80303; Louis A. Valentine, 11444 E. 4th, Aurora, Colo. 80010

[22] Filed: July 3, 1974

[21] Appl. No.: 485,550

[52] U.S. Cl. .............................. 280/236; 280/282
[51] Int. Cl.² ............................................ B62M 9/00
[58] Field of Search ....... 280/282, 236, 261; 180/76

[56] References Cited
UNITED STATES PATENTS

| | | | |
|---|---|---|---|
| 488,745 | 12/1892 | Taitte | 280/261 |
| 2,879,859 | 3/1959 | Swisher | 180/76 X |
| 3,466,059 | 9/1969 | Kiernan | 280/282 X |
| 3,834,721 | 9/1974 | Gobby | 280/236 |

*Primary Examiner*—Leo Friaglia
*Attorney, Agent, or Firm*—Van Valkenburgh, Lowe & Law

[57] ABSTRACT

The conventional tricycle includes a front steering wheel and left and right rear wheels with the driver's seat positioned therebetween. In the improved drive mechanism, both rear wheels are mounted upon a common drive shaft. The standard pedal drive for the tricycle, located below the driver's seat, includes a drive chain which extends rearwardly to a sprocket upon the drive shaft. Each wheel is mounted upon the drive shaft on a forwardly directed one-way bearing, thus permitting the rear wheels to rotate at different speeds whenever the tricycle is turning. This basic arrangement may be supplemented by various speed shift mechanisms, for example, by the use of a plurality of sprockets on the drive shaft and a derailleur system at the rear drive shaft to shift the drive chain upon any selected sprocket.

7 Claims, 8 Drawing Figures

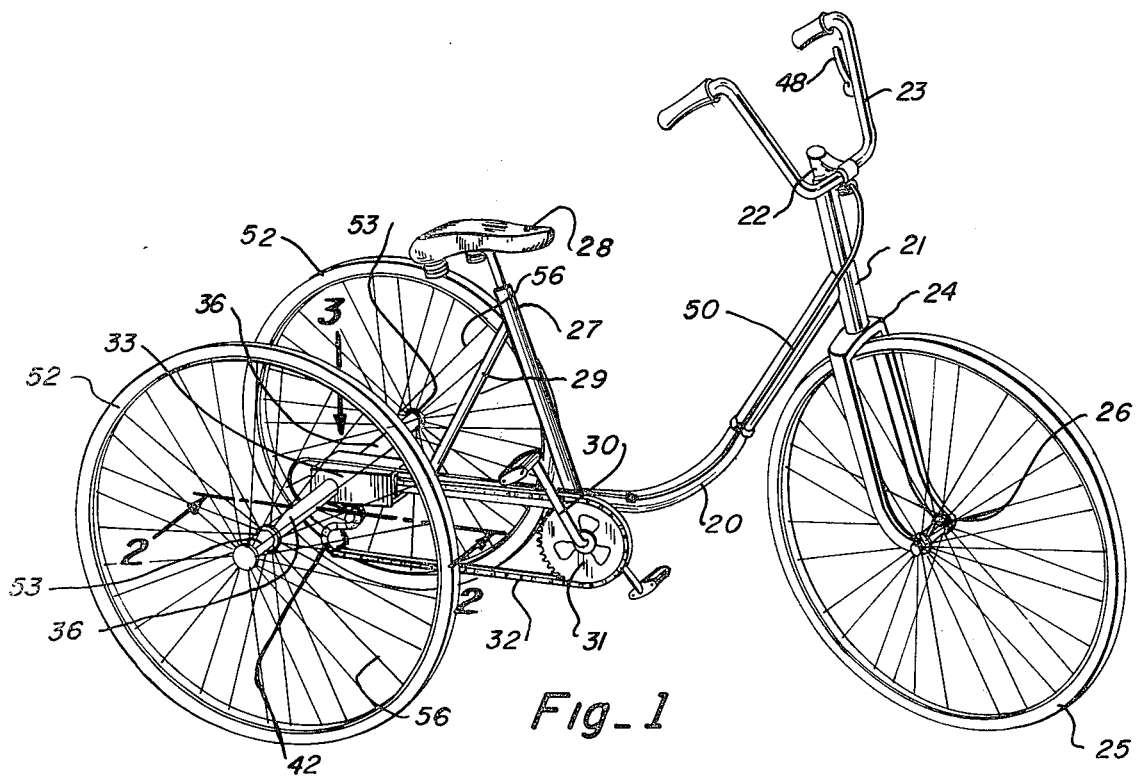
Fig_1
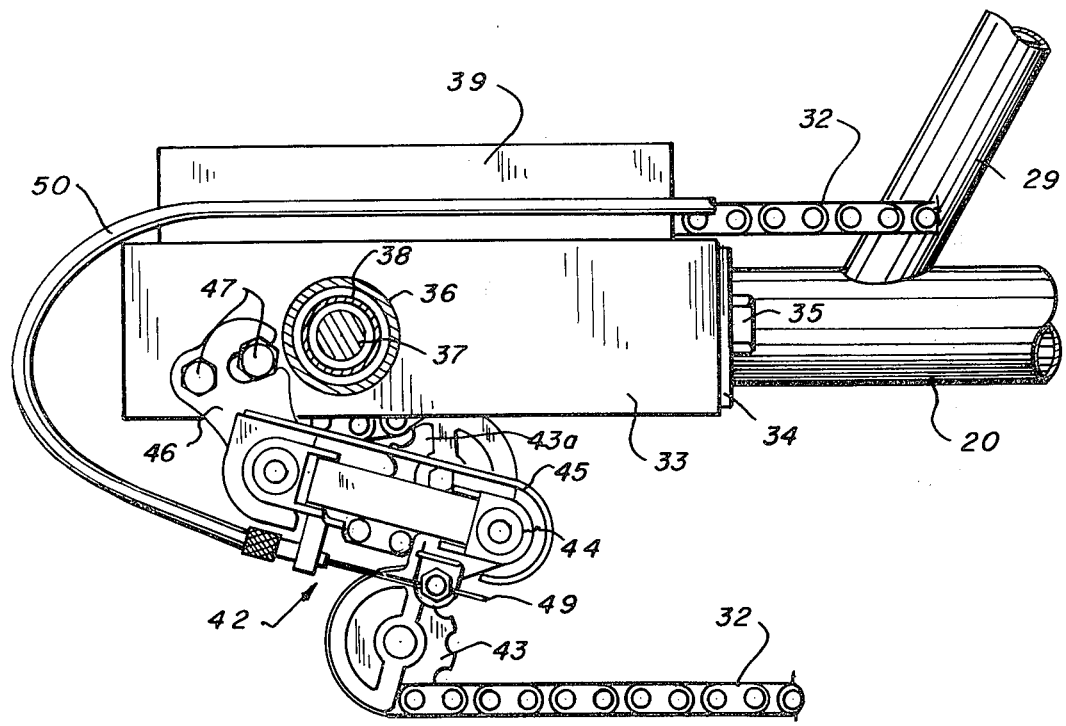
Fig_2

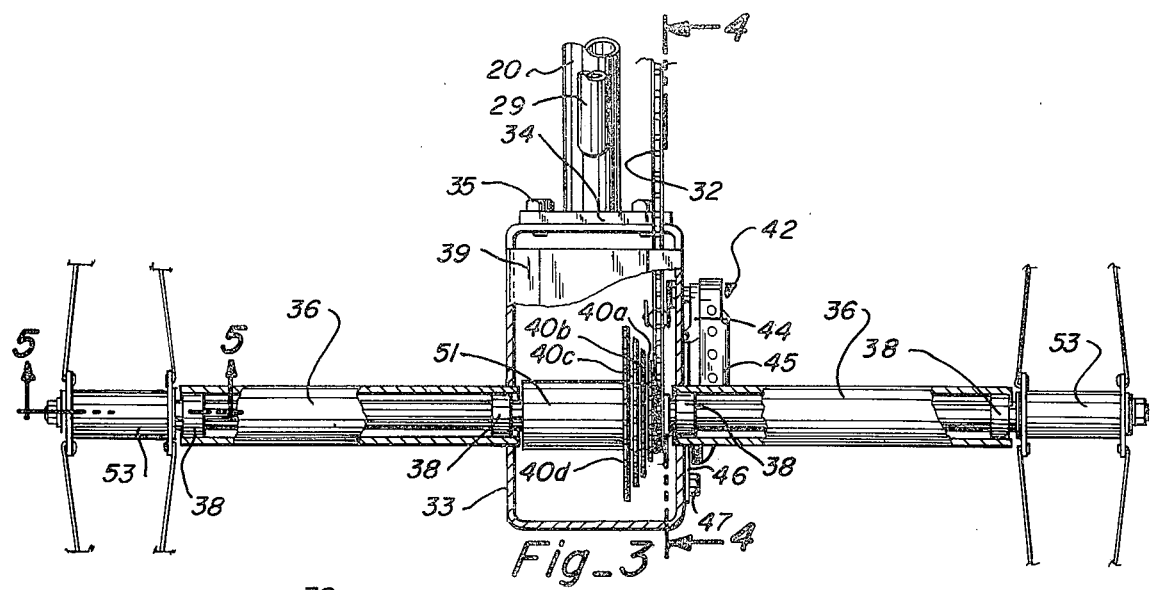
Fig_3
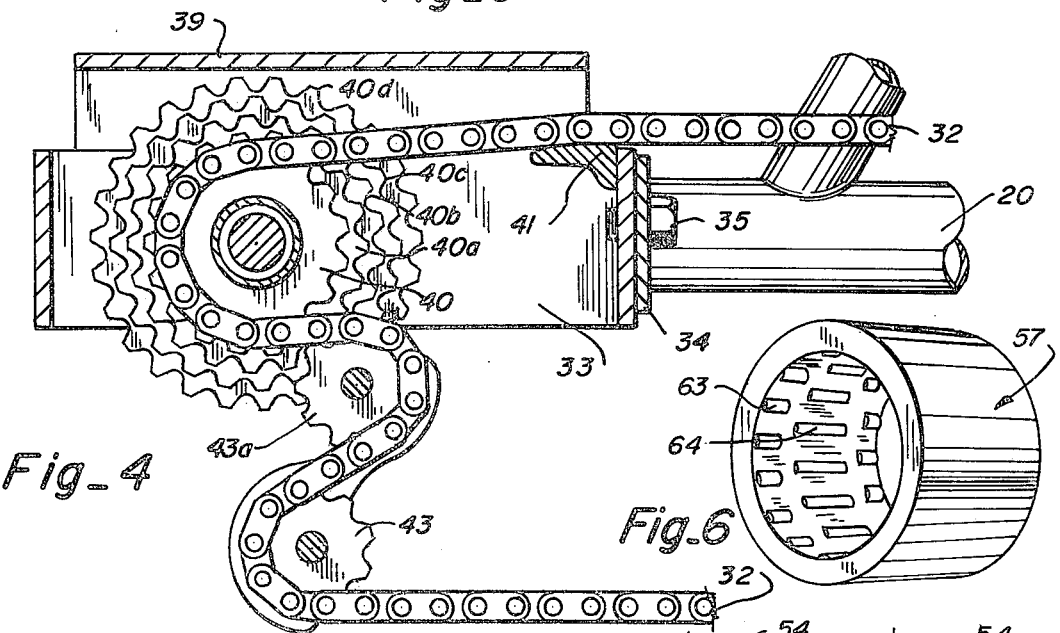
Fig_4
Fig_6
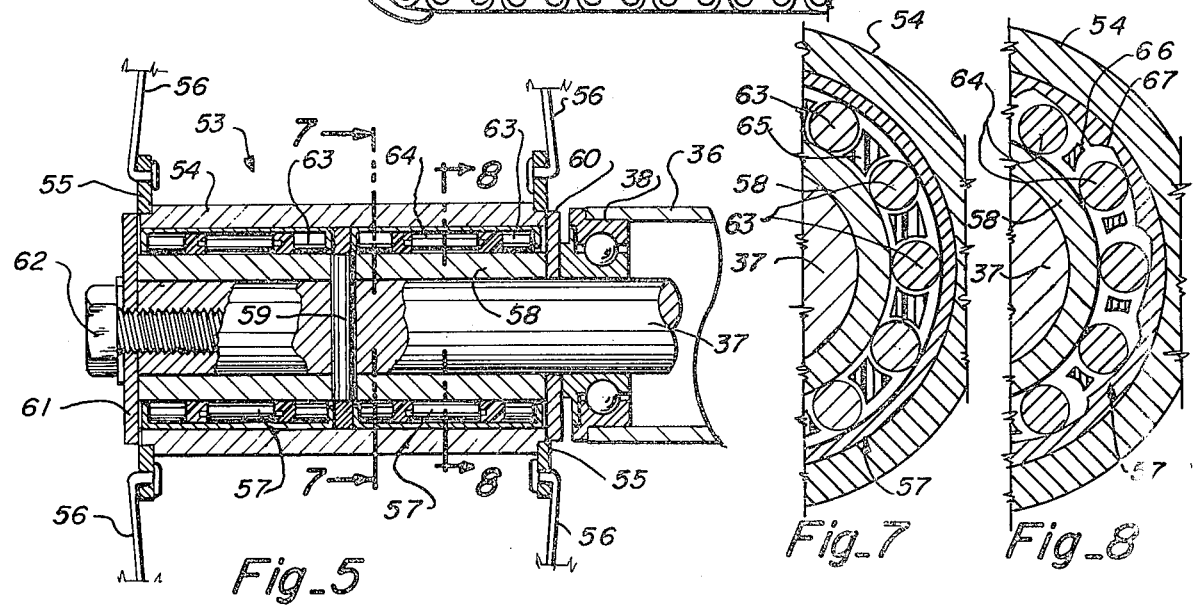
Fig_5
Fig_7
Fig_8

REAR WHEEL DRIVE FOR A TRICYCLE

The present invention relates to rear wheel drives for tricycles, and more particularly to a rear wheel drive system wherein both rear wheels are connected to a common shaft.

With the advent of the fuel shortage, there has been an increase in the demand for bicycles and tricycles for adult use. The tricycles constitute a supplement or substitution for bicycles where the adult rider is not especially agile or does not have a good sense of balance and accordingly, the tricycles are especially desired by older persons or, for the matter, any adult who is not adept at riding a bicycle.

Actually, a tricycle is, in many ways, the same as a bicycle. The unit is built about a tubular body frame which is carried upon a front steering wheel having a handle bar essentially the same as that of a bicycle. A seat upstands from the central portion of this frame; foot pedals are located below the seat which are associated with a sprocket chain drive extending to a shaft connecting with the rear wheels of the tricycle in the same manner as a sprocket chain drive of a bicycle extends to the rear wheels of the bicycle. Actually, the primary difference between a tricycle and a bicycle resides in the fact that the tricycle uses a pair of rear wheels, which are spaced apart in a symmetrical manner and are aligned on a common transverse axis, while the bicycle uses a single rear wheel.

However, the drive system for a tricycle is not as simple as the drive for a bicycle. In the first place, whenever a rider makes a turn, the rear wheel at the outside of the turn will follow a longer path than the rear wheel at the inside of the turn. Thus, the two rear wheels will not rotate the same and they cannot be rigidly connected to a common rear, transverse shaft. Instead, if both rear wheels are to be driven, a differential must be used at the rear shaft. In conventional commercial tricycle constructions, this problem is often obviated by mounting the two rear wheels upon separate axles with the chain drive being connected to only one axle and with the wheel on the other axle being an idler. Such an arrangement is not entirely satisfactory because there is a tendency for the rear wheel to which the driving chain is connected to throw the tricycle out of alignment and to pull in the direction of the driven wheel, especially when the rider is pedaling uphill. However, when the requirements of lightness and the need to keep manufacturing costs low are considered, it becomes apparent that a differential of a type which can properly make both rear wheels operative, such as the differential used in automobiles, is not a practical solution.

Another problem concerning tricycle drives resides in the need for a shifting system for varying the gear ratio between the pedal and the rear wheels. This need and demand for a shifting system in the tricycle is largely an outgrowth of the success of simple shifting systems used with bicycles, such as the 5-speed or 10-speed derailleur shifting systems. This shift system is mounted upon the end of an axle shaft of a bicycle adjacent to a nest of sprockets to shift the chain from one sprocket to another. Another shift system commonly used is a 3-speed hub type shift which carries gears within the hub of the rear wheel. To applicant's knowledge, the derailleur system has not been considered as being suitable for a tricycle because of mounting problems. However, in one commercial tricycle, a 3-speed hub is used by mounting it upon a short, intermediate shaft between the drive sprocket and the rear wheel shaft with the pedal chain drive to the intermediate shaft. Other sprockets on the hub extend from the intermediate shaft to the rear wheel drive shaft at each side and one-way clutches on each intermediate drive shaft, all to provide a comparatively complicated differential structure which is also heavier and more expensive than that desired for a tricycle.

The present invention recognizes the need for a simplification of the drive system of a tricycle and was conceived and developed with the foregoing and other considerations in view. The invention comprises, in essence, the expedient of mounting the rear wheels of the tricycle upon a common, transverse, rear shaft by the judicious placement of one-way bearings upon the wheels and then connecting the drive chain from the pedals directly to a sprocket upon this single shaft, at the center of the tricycle. It was further discovered that with this simple arrangement of a drive directly connected to this single shaft, an efficient shifting system could be incorporated into the drive either at the pedal sprocket or at the rear wheel shaft. In the latter instance, a rear, derailleur mechanism could be used, with a nest of sprockets mounted upon the rear wheel shaft and with the derailleur shifting mechanism disposed alongside the rear wheel shaft in a manner which is similar to the shifting system of a conventional bicycle.

It follows that an object of the invention is to provide a novel and improved construction of a drive for a tricycle which is reduced to a most simple arrangement by using a single shaft for supporting and driving the wheels of the tricycle.

Another object of the invention is to provide a novel and improved drive for a tricycle with advantageously uses a single rear-wheel drive shaft which is directly connected to the pedal drive at the central section of the tricycle.

Another object of the invention is to provide a novel and improved drive for a tricycle which is fully balanced in its structure and in its operation to improve the control and maneuvering capability of the tricycle.

Another object of the invention is to provide a novel and improved drive for a tricycle which can use a standard derailleur type of shifting system at the rear wheel shaft and/or at the pedal sprocket to produce a shifting performance which is essentially the same as that possible with a bicycle.

Other objects of the invention are to provide, in a drive for a tricycle, a system which is simple, economical, neat appearing, efficient, reliable, rugged and durable.

With the foregoing and other objects in view, the present invention comprises certain constructions, combinations and arrangements of parts and elements as hereinafter described, defined in the appended claims and illustrated in preferred embodiment in the accompanying drawings in which:

FIG. 1 is a perspective view of a tricycle having the improved rear wheel drive incorporated into its structure;

FIG. 2 is a fragmentary view of the tricycle to show the central portion of the rear wheel drive, as taken from the indicated line 2—2 at FIG. 1, but on an enlarged scale;

FIG. 3 is a plan view of the rear wheel drive of the tricycle as taken substantially from the indicated arrow 3 at FIG. 1, but on an enlarged scale and with portions of components broken away to show parts otherwise hidden from view;

FIG. 4 is a fragmentary sectional view of the sprocket gears and a portion of the shifting mechanism as taken from the indicated line 4—4 at FIG. 3;

FIG. 5 is a sectional view of a wheel hub as taken from the indicated line 5—5 at FIG. 3, but on a further enlarged scale;

FIG. 6 is a perspective view of a clutch bearing which is used in the hub shown at FIG. 5;

FIG. 7 is a fragmentary sectional detail as taken from the indicated line 7—7 at FIG. 5;

FIG. 8 is a fragmentary sectional detail as taken from the indicated line 8—8 at FIG. 5.

Referring more particularly to the drawing, FIG. 1 shows an adult's tricycle which incorporates into it the present invention, as will hereinafter appear. The body of this tricycle includes a simple, tubular frame 20 bent at its center to provide an essentially horizontal rear portion at the elevation of the rear wheel axle and an upturned forward portion whose extended end carries an upright tubular sleeve 21 wherein a front wheel steering post 22 is mounted. The top of this post 22 is connected with handle bars 23 while the lower portion, below the base of the sleeve 21, is a wheel fork 24 which embraces and holds the front wheel 25 of the tricycle, the ends of the fork holding the shaft of the front wheel hub 26, as shown. This arrangement of a sleeve 21 at the front end of the frame tube 20, the steering post 22 therein, the handle bars 23, the forks 24 to carry the front steering wheel 25, is standard with both tricycles and bicycles and need not be described further.

The framework of the tricycle is comparatively simple and a post 27 upstands and slopes rearwardly at a small angle from the central portion of the frame 20, near the base of the bend, to carry a seat 28. A strut 29, angled rearwardly and downwardly from the post 27, connects to the rear end of the frame tube 20 to reinforce the post 27 on the frame. A short, transverse bearing, not shown, is affixed to the underside of the frame tube 20 below the post 27 to carry foot pedals 30. A pedal sprocket 31 is mounted on the pedal shaft at one side of the frame 20 and carries a drive chain 32 which extends rearwardly to the rear of the tricycle. This arrangement of the pedals 30, the sprocket 31 and the drive chain 32 is also conventional on bicycle structures and need not be described further. Although not shown, the arrangement could include a double sprocket instead of a single sprocket 31 where a front derailleur system is used.

In the present invention, the rear end of the frame terminates as an open-bottom, box-like housing 33 which is abutted against a flange 34 at the rear end of the tube 20 and secured in place by bolts 35 as best shown at FIG. 2. A tubular axle housing arm 36 extends from each side of the housing 33 in axial alignment with its opposing arm. A transverse rear axle 37 extends through each housing arm 36 and through the housing box 33 with each end of the axle 37 projecting from an end of a housing arm 36 to hold a rear wheel as hereinafter described. The rear axle 37 is held in place in the housing arms 36 by journal bearings 38 at each end of each housing arm as best shown at FIG. 3, the outer bearings supporting the wheels and the inner bearings supporting a driven sprocket, or sprockets, within the housing box, which will now be described.

The housing box 33 is formed as an elongated, rectangular loop or frame having a roof-like lid 39 which is open at each end. The drive chain 32 extends from the pedal sprocket to a driven sprocket on the rear axle 37 with the bottom reach of the chain extending to a sprocket 40 on the axle 37 from underneath the open bottom of the housing box 33 and the upper reach of the chain 32 extends from the sprocket 40 to the drive sprocket 31 above the housing box 33 and through an end opening under the lid 39. A slide 41 may be provided at the front wall of the housing box 33 to prevent the chain 32 from striking the front wall of the housing 33 when the sprocket 40 is so small that the chain 32 is not above this front edge of the housing, as best shown at FIG. 4.

The central portion of the rear axle 37 which lies within the housing 33 may have a single sprocket 40 about which the chain extends, or it may include a nest of sprockets 40, 40a, 40b, 40c and 40d as best shown at FIGS. 3 and 4. When such a nest of sprockets is provided, a derailleur shift 42 is used to shift the chain from one sprocket to another. When a nest of sprockets is used, it will be positioned at one side of the housing to be essentially in line with the chain 32 extending rearwardly from the pedal sprocket 31 to permit shifting operations. In such a position, the sprocket nest will be at one side of the housing 33 as illustrated at FIG. 3. This permits a derailleur shift mechanism 42 to be attached to a side of the housing 33 to extend therebelow and to engage the lower reach of the drive chain 32.

The derailleur shift mechanism 42 is located below the nest of sprockets 40, 40a, 40b, 40c and 40d to engage the lower reach of the chain 32, as best illustrated at FIGS. 2 and 4. It is a conventional unit including two idler chain-guide sprockets 43 and 43a which are pivotally mounted one above the other upon a lateral shift arm 44. The shift arm 44 is secured to a vertical swing arm 45 and this arm, in turn, is pivotally mounted upon an abutment 46 which is securely attached to the wall of the housing 33 as by lock bolts 47. The derailleur can shift the drive chain 32 from one sprocket to another by movements of the shift arm 44 and swing arm 45. Such movements are controlled by a hand lever 48 at the handle bars 23 of the tricycle which pulls a cable 49 threaded through a fixed tube 50 which extends from the handle bar to the drailleur. This shifting action is essentially conventional and need not be described further.

It is to be noted, however, that the abutment 46 of the derailleur which is attached to the wall of the housing, is ordinarily designed for attachment to the shaft itself, but in this situation, such is not possible because the shaft is within the housing arm 36. However, it was found that if the standard bracket were shifted somewhat to the rear and downwardly at an angle of approximately 15° with respect to the normal horizontal of the housing 33, the action of the derailleur unit would effectively shift the chain 32 to any of the several sprockets. It is to be noted that the group of sprockets 40, 40a, 40b, 40c and 40d can be obtained as a conventional unit in combination with the derailleur shift and that this commercial unit can be mounted directly upon the rear axle 37 by securing its hub 51 to the axle 37 within the housing. It is also to be noted that in some commercial units, the sprocket nests will be provided with a one-way clutch system and where such commercial units are available, the one-way clutch system will not detract from the operation of the tricycle according to the invention.

Through the system above described, the rear axle 37 is driven to drive the rear wheels 52 of the tricycle. Each rear wheel is of a conventional construction, using spokes extending from the rim to the hub 53. The hub 53, however, is modified as will be described to accommodate a set of one-way bearings between it and the axle 37. By using one-way bearings to support the wheel upon its axle, which are directed to permit free wheeling of each wheel in a forward direction of rotation, but to otherwise lock with the axle 37, the necessary differential movements between the two rear wheels is accomplished. Thus, whenever the rider is pedalling the tricycle forwardly, the axle 37 will lock with both rear wheels. When turning, however, the axle 37 will lock with the slower moving rear wheel and the faster moving rear wheel, at the outside of the turn, will rotate freely ahead of the other in a manner which is analogous, although not quite the same, as the movements accomplished with a conventional differential.

It has been proposed in analogous wagon structures, to use ratchet and pawl mechanisms at each wheel to accomplish a desirable, free wheeling effect, but the general idea has been rejected in the past because of wear problems, chattering and irregular performance of the mechanisms. Although the use of one-way bearings in a tricycle, at the rear wheels of the tricycle, appeared to be a simple expedient, the arrangements heretofore considered have been considered impractical.

Referring to the hub structure as best shown at FIG. 5, the hub 53 is formed as an outer, tubular sleeve 54 having spoke retaining flanges 55 at each end of the sleeve to hold an array of spokes 56, as indicated. A pair of commercial, one-way bearings 57, as hereinafter further described, is fitted into this sleeve 54 with a tight, non-slip, press fit to complete the hub structure. The end of the axle 37, which extends from the axle housing arm 36, carries a tubular, hardened sleeve 58 having an inside diameter which fits snugly upon the axle 37 and is secured therein in place with a lock pin 59. The outside diameter of the axle sleeve 58 provides a polished, hardened surface whereon the rollers of the bearings 57 may rotate. To complete the assembly, thrust washers 60 and 61 are mounted at each end of the axle sleeves 58 to overreach the ends of the bearings 57 and to engage or to lie closely against the ends of the sleeve 54 to enclose the bearing assembly. The inner thrust washer 60 abuts against the outer end of the adjacent journal bearing 38 in the housing 36, while the outer thrust washer 61 abuts against the end of the axle 37 and is secured thereto by a bolt 62 which turns into the end of the shaft with a tight, solid fit.

The one-way bearings 57 are available as commercial units. Since approximately 1940, improved constructions of roller bearings have included clutch-type units, the one type commonly available being known as a Torrington Drawn Cup Precision Roller Clutch of the Torrington Company at Torrington, Conn. Both roller clutches and roller bearings are available for the purpose at hand and one common type, a clutch and bearing assembly, may be used in the hub to form the one way bearing 57. Two of these one-way bearings 57 are illustrated as being used in the hub 53 as shown at FIG. 5, and a single bearing cup 57 is illustrated at FIG. 6. This cup includes outside arrays of rollers 63 which function as bearings and a central array of rollers 64 which function as a clutch. The bearings, as illustrated at FIG. 7, include an array of rollers 63 which are held apart by a spacer ring 65 and rotate about the sleeve 58 and the inner face of the bearing cup 57, both surfaces and the rollers being specially hardened to minimize wear. The clutch section, as shown at FIG. 8, includes a comparable array of rollers 64 which are held in place in the sleeve by a spacer ring 66 which is fixed with respect to the bearing cup 57. The bearing cup 56 includes wedging sockets 67 permitting the rollers to lie loosely when the axle rotates in the bearing 57 in the freewheel direction, but to grab when the axle commences to rotate in the opposite direction.

It is to be noted that separate clutch and bearing components may be used in the hub as well as the combination units, providing that such bearings be secured into the hub sleeve 54 with a tight, non-slip fit.

To complete the tricycle, it will include other components, not shown in the drawing, such as mud guards and brakes; however, such are not essential to the present invention and hence need not be further described.

We have now described our invention in considerable detail. However, it is obvious that others skilled in the art can build and device alternate and equivalent constructions which are nevertheless within the spirit and scope of our invention. Hence, we desire that our protection be limited not by the constructions illustrated and described, but only by the proper scope of the appended claims.

We claim:

1. In a tricycle formed upon a generally tubular frame, of the type having a front steering wheel, a pair of rear drive wheels, a rider's seat therebetween and a pedal drive below the rider's seat including a drive chain extending rearwardly therefrom, the improvement comprising:
   a. a single, transversely disposed drive shaft carried in frame bearings with each end connecting with a rear wheel to normally drive both rear wheels in unison,
   b. a sprocket means at the shaft including a sprocket on the shaft at the center portion thereof and connected with the aforesaid drive chain to rotate responsive to operation by the pedal drive,
   c. a bearing means connecting each rear wheel to the drive shaft including a one-way bearing to permit the drive shaft to engage with the wheel whenever the shaft is being driven forwardly and to permit the wheel to rotate forwardly ahead of the drive shaft whereby one rear wheel may rotate faster than the other when the tricycle is turning; and
   d. a box-like housing at the rear portion of the tricycle framework encasing a portion of the drive shaft and the sprocket mounted thereon, with the upper reach of the drive chain extending from an opening near the top of the housing and the lower reach of the chain extending from below the housing.

2. In a tricycle formed upon a generally tubular frame, of the type having a front steering wheel, a pair of rear drive wheels, a rider's seat therebetween and a pedal drive below the rider's seat including a drive chain extending rearwardly therefrom, the improvement comprising:
  a. a single, transversely disposed drive shaft carried in frame bearings with each end connecting with a rear wheel to normally drive both rear wheels in unison,
  b. a sprocket means carried on the shaft at the center portion thereof and connected with the aforesaid drive chain to rotate responsive to operation by the pedal drive,
  c. a bearing means connecting each rear wheel to the drive shaft including a one-way bearing to permit the drive shaft to engage with the wheel whenever the shaft is being driven forwardly and to permit the wheel to rotate forwardly ahead of the drive shaft whereby one rear wheel may rotate faster than the other when the tricycle is turning, and
  d. a bearing means upon the drive shaft carrying the said sprocket means including a one-way bearing permitting the sprocket means to engage the drive shaft whenever the sprocket means is being driven forwardly and to permit the shaft to rotate forwardly when the sprocket means is not rotating.

3. In the organization defined in claim 1, including:
tubes outstanding from the housing wherein the shaft is mounted and bearings in the tube to rotatably support the shaft.

4. In the organization defined in claim 1 including:
a plurality of sprockets mounted upon the shaft and shifting means mounted upon the framework adjacent to the shaft adapted to shift the drive chain from one sprocket to the other.

5. In the organization defined in claim 1 wherein:
the bearing means at each rear wheel includes a journal bearing at each side of the one-way bearing.

6. In the organization defined in claim 1 wherein:
each wheel includes a central tubular hub and the bearing means are carried within a cylindrical cup-like container, with the container being tightly fitted into the hub.

7. In the organization defined in claim 6 including:
a hardened sleeve tightly fitted upon each end of the shaft and proportioned to engage the bearing components of the bearing means within the hub, said tube being further proportioned to carry washers at each end to enclose the hub against dust and the like.

* * * * *